(12) United States Patent
Clater

(10) Patent No.: US 7,640,225 B2
(45) Date of Patent: Dec. 29, 2009

(54) SYSTEM AND METHOD FOR PROCESS AUTOMATION AND ENFORCEMENT

(75) Inventor: Gene Clater, Northampton, PA (US)

(73) Assignee: Computer Aid, Inc., Allentown, PA (US)

( * ) Notice: Subject to any disclaimer, the term of this patent is extended or adjusted under 35 U.S.C. 154(b) by 259 days.

(21) Appl. No.: 11/249,744

(22) Filed: Oct. 14, 2005

(65) Prior Publication Data

US 2006/0095915 A1 May 4, 2006

Related U.S. Application Data

(60) Provisional application No. 60/618,231, filed on Oct. 14, 2004.

(51) Int. Cl.
G06N 5/02 (2006.01)
G06F 17/00 (2006.01)
G06F 17/20 (2006.01)

(52) U.S. Cl. .......................... 706/50; 706/11

(58) Field of Classification Search .................. 706/11, 706/45, 48, 50
See application file for complete search history.

(56) References Cited

U.S. PATENT DOCUMENTS

| | | | | |
|---|---|---|---|---|
| 6,263,358 | B1 * | 7/2001 | Lee et al. | 718/100 |
| 6,574,537 | B2 * | 6/2003 | Kipersztok et al. | 701/29 |
| 7,139,720 | B1 * | 11/2006 | Foell et al. | 705/8 |
| 7,222,082 | B1 * | 5/2007 | Adhikari et al. | 705/8 |
| 2002/0040312 | A1 * | 4/2002 | Dhar et al. | 705/8 |
| 2003/0088534 | A1 * | 5/2003 | Kalantar et al. | 706/50 |
| 2003/0195799 | A1 | 10/2003 | Scholl et al. | |
| 2003/0225662 | A1 * | 12/2003 | Horan et al. | 705/36 |
| 2003/0225663 | A1 * | 12/2003 | Horan et al. | 705/36 |
| 2004/0143477 | A1 | 7/2004 | Wolff | |
| 2005/0055662 | A1 * | 3/2005 | Strausbaugh et al. | 717/100 |
| 2005/0125275 | A1 * | 6/2005 | Wright et al. | 705/9 |
| 2005/0165631 | A1 * | 7/2005 | Horvitz | 705/7 |
| 2005/0177531 | A1 * | 8/2005 | Bracewell | 706/45 |
| 2007/0027827 | A1 * | 2/2007 | Balagaev | 706/45 |
| 2007/0203786 | A1 * | 8/2007 | Nation et al. | 705/11 |

OTHER PUBLICATIONS

Harrison, T.H. et al. "The Design and Performance of a Real-time Corba Event Service" ACM. 1997.*
Coulouris, G. et al. "Distributed Systems: Concepts and Design—Second Edition" Section 3.2. pp. 381-391. Addison-Wesley 1994.*
Press Release—Kitana IT Goverance Suite 5.0—dated Jun. 9, 2003, pp. 1-2.
Harrison, T.H., "The Design and Performance of a Real-Time COBRA Event Service," OOPSLA '97. ACM. Oct. 1997, pp. 184-200.

* cited by examiner

*Primary Examiner*—David R Vincent
*Assistant Examiner*—Benjamin Buss
(74) *Attorney, Agent, or Firm*—Blank Rome LLP

(57) ABSTRACT

In process automation, processes are entered and enforced on team members through a Web interface. Processes are selected from a process library and can be updated as needed. Governance algorithms guide team members in carrying out the processes. The Web interface comprises a dashboard indicating an expected status and an actual status of each task.

15 Claims, 7 Drawing Sheets

SYSTEM AND METHOD FOR PROCESS AUTOMATION AND ENFORCEMENT

REFERENCE TO RELATED APPLICATION

The present application claims the benefit of U.S. Provisional Patent Application No. 60/618,231, filed Oct. 14, 2004, whose disclosure is hereby incorporated by reference in its entirety into the present disclosure.

FIELD OF THE INVENTION

The present invention is directed to a system and method for process automation and in particular to such a system and method in which processes are entered through a Web interface and enforced on team members through a Web interface, and in which the Web interface comprises a dashboard indicating an expected status and an actual status of each task.

DESCRIPTION OF RELATED ART

It was learned in manufacturing systems 20 years ago that Processes could be developed and perfected to produce results with an error rate of 6 Sigma or 99.97 perfect. These processes were expressed onto machines to manufacture using the processes, and thus modern manufacturing was created, which instantly eliminated those who were not using it from the marketplace as 6 Sigma error rate compared to even 90% process quality means the difference between 3,000 manufacturing errors at 90% versus 1 at 6 Sigma.

Up until now, the ability to use this technique of developing unique Processes and embossing them on to Information processing or people operations has not been successfully fully automated. Manual attempts have shown the promise that 6 Sigma can offer modern Enterprises.

Various techniques that seek to overcome the above-noted problems are known in the art. For example, United States Published Patent Application No. US 2003/0195799 A1 to Scholl et al teaches a combination of quality management with a process flow. Also, United States Published Patent Application No. US 2004/0143477 A1 to Wolff teaches project management from a set of templates. However, the prior art does not solve the above-noted problems.

SUMMARY OF THE INVENTION

It is therefore an object of the invention to provide such automation.

This Invention is constructed via an Internet based software system that automates the recording of Processes into a Process Library via its Process Configuration Manager, PCM. The recorded Processes can be modified via the PCM to reflect re-engineering as their use uncovers weaknesses and/or need for alterations to improve their effectiveness. The automated Processes can also be adjusted to fit special/new situations.

The Invention then implements its Governance Algorithms and sequences to guide assigned resources to carry out their work on a Project or other work Event according to the process's engineered steps/tasks contained within it. Using its automation to apply proven Process and monitor effectiveness via embedded Metrics in the Invention, empowers the Enterprise management to achieve lower errors and consistent Process results approaching the 6-sigma level of measured consistency and thereby achieve the required high level of On-Time/On-Budget Project successes it seeks.

In addition to building the Process Library via the PCM, installation of the Invention requires entry of the Enterprise's Organization structure (this represents the organizations within the Enterprise that will carry out the work Events fed into it; they are referred to as the "Managing Organizations" or MO's). Also, security information cross referenced to resources and their organizational authorizations plus all the information on the resources themselves is required. The Enterprise's planned Users of the Invention (called Customer Organizations or CO's) are also entered including sponsors, managers, executives and departments that will submit work Events to the system.

Once installed, access is made available to all MO and CO resources that will use it inside and outside the Enterprise via Internet or Intranet connections. Appropriate security subsystems are built-in to protect the Invention and its Data Base from "hackers" or Enterprise personnel not authorized to use it.

Training is required and is provided for those who will set it up or act as Enterprise Process Engineers and for those who will interpret and act upon the Reports Metrics at the Tactical level.

In addition, authorized managers, project stakeholders and general non-technical users such as senior executives and others can use the near-zero-training required, Internet-friendly, Web Portals or Dashboards as they are referred to in the Invention, plus graphical reports, to avail themselves of the Invention's information A cycle of use of the Invention begins when a trained resource uses the Invention to connect a selected Library Process to a Project or work Event activity. Upon making that selection/connection and pressing the "Save" function, the Invention launches its Project Validation Engine, PVE, to determine the first step to be taken from the selected Process.

Resources are assigned/connected to the Event from the resource pool entered from the systems Data Base using Invention functionality (per above setup actions). The Invention then guides and assures Process Conformance and Governnance of the assigned resources according to the steps, dependencies, rules and tasks prescribed in the selected Process.

Once launched, the work Event is managed by the Invention's Governance algorithms to manage the work flow of the resources assigned to the work Event via the Process and the PVE to assign steps/tasks as prescribed in the stored Process. This Governance spans all the effort needed to open, perform all steps/tasks and complete, or close, the work Event.

The Governance and enforcement over the application of the Process to the work Event and the associated byproducts of the Invention's internal algorithms automate other vital functions such as measurement, time accounting and automatic feedback loops to report issues for real-time Management action. Some of these features along with more specifics on above functionality implementations are as follows:

1. The Invention's PVE is the core logic to drive the automated functionality that uses the previously defined and stored Processes from the Data Base. Modification of the Process will cause real-time modification of how a work Event is handled by the resources assigned on the next use of the process. This flexible attribute of the Invention is one of its key features as can be seen from the following examples of how it can be used by an Enterprise or Team:

a. Mature highly used business or operating manual Processes of the Enterprise can be entered into the system. Thus they move from Manual usage into the Process Library via PCM thus enabling their use when selected and assigned to a work Event to guide resources according to the previously perfected manual Process proven techniques and rules.

b. As these automated versions of the old manual Processes mature as further improvements are found and incorporated in them via the PCM, the organization's performance when using the new and improved processes also improves. This is one of the Process Lifecycle loops available in the Invention that results in Enterprise work Event completion improvements.

c. The Invention's Process Library functions following recording the Processes to be used for all Enterprise work Events via the PCM can execute a "Locked Down" function to disallow any changes to them. Industries under Government regulation where exact adherence to Processes is required along with the ability to show compliance via the strictly enforced Governance logic of the Invention, benefit from this functionality as not following regulations can be an "out of business" event and/or lead to criminal actions against executives as seen frequently in today's global business environment.

d. The Invention's Process Library functions (when not in "Lock Down" mode) can create new Processes by cloning and altering Processes that have new required steps/tasks or work arounds or dependencies to eliminate issues/problems that may be encountered by the resources as they use the Processes in real world situations.

e. The Enterprise can decide to use the many Processes that come with the Invention for Managing the Maintenance of IT systems, Construction of IT systems and other operational and Industry centric Processes already available for immediate use in the Process Library.

f. The Invention's Process Lifecycle includes the search for "6 Sigma" results through Process Entry, Process use and detection of improvement requirements. Process changes and adaptations of alterations to the steps/tasks "perfects" and "matures" the Processes.

g. The Invention provides for allowing Processes to be entered and stored that come from other sources such as Industry Groups for additional Best Practices and/or Professional Organizations suggesting Processes and methodologies for improving Project performance via new resources and schedules steps/tasks.

All resources using the Invention within one Enterprise operate as a common pool to the Invention with known Organizational and Security information for their control per above installation information.

The Invention provides a Web Portal or Dashboard for every authorized resource. It can display on the MO resource's "Dashboard" the steps/tasks assigned them. These work Event steps/tasks are in priority order with information on Event scheduling, escalation and priority for the resource to use thus further implementing the Invention's Process Governance features. Additional Dashboard displays based on work Event and Process Performance Metrics are available to all authorized resources and users.

Further use of the Invention's Process Governance algorithms occurs when a resource completes a step/task in the Process. At that point, the PVE automatically determines what the next step/task is and moves it to the resource's Dashboard with the appropriate priority order given the real-time information available to it from the other assignments pending for the resource per the Data Base at that point in time.

The resources, as they complete steps refer back to their Dashboards for their next assignment thus implementing the Invention's automated real-time dynamic work flow assignment features.

The Invention has logic that is aware that each step/task when completed requires the effort to be entered by the resource(s) that carried it out and confirmation of time remaining. Hourly time (or fractions thereof) must be entered by the resources as they complete tasks on a daily or weekly basis. Control reports enforce time entry completion such that for a selected time period all time data for resources and steps/tasks for all in process Events are available. Historical time entry is also available in the Data Base. Non-Event time can also be entered such that the Invention's time keeping data can be a directly interfaced to Enterprise Financial systems for Payroll, indirect time accounting and others if desired.

The collection of time expended and time to complete all Events' steps/tasks is critical to the built-in measurement algorithms of the Invention. At the core of the Invention, is the capability to improve Enterprise work Event success ratios and productivity by the accumulation of exact task time measurements against concise and precise Process steps/tasks as enforced by the Invention's Governance logic.

The Invention contains a powerful Metric Engine run on its own DataMart Data System or DMDS© that can deliver information to management through their Dashboards or via automatic emails or through Metric reports that are action reports about the performance of the resources on the Events according to anticipated results versus actual results occurring per latest time entry. This gives management the information they need to address Event problems such as: Events off-schedule, Events using more budget dollars then allocated, Events not performing according to plan/Process. In addition, hosts of Resource performance comparison Metrics for spotting resource behavior issues and others that directly increase Productivity are provided.

The further mixing and rolling up of these Metrics into specific higher level Process Metrics with exact performance and productivity targets built into the Invention's Logic creates operating/management information for not only Tactical Event management improvement at the Team Lead level, but Information for the highest levels of management as the Metrics reflect performance to span wider organization entities and resource grouping contained in the Invention's Data Base describing the Enterprise Organization structures (per setup information supplied at installation, see above).

In addition, these Metrics are key for improving the underlying Processes themselves which then fuels the Invention's Process Lifecycle automated built-in improvement system of modification to Library Process which in turn are applied at the next instance of the work Event connection to them. This is referred to as an example of an automated "Learning Loop" within the Invention, driven by standard known manual "Continuous Improvement" Best Practices.

The Invention has a rich implementation of functionality for issue/problem tracking and reporting. Although this is not a new idea, the way the Invention integrates it into Governance and Event execution monitoring is. As resources attempt to carry out the Process Steps per their Dashboards and issues occur they can, with a click of the mouse, immediately evoke issue reports crossed referenced to the step/task in a specific Event execution under a specific Process. Thus the Invention is able to not only report on all issues/problems immediately to Event sponsors and selected management (both done via integrated email and the Invention's Dashboards for these individuals), but this information is also stored for later Root Cause Analysis on the exact condition that caused the issue for further study by management. This information can then be added to Risk Data Bases associated with the Process and work Events for historical data for use in Risk Assessment.

Using this set of cycles within the Invention allows it to automate classical "Continuous Improvement" at four levels:
1. For resources: It provides comparative performance statistics specifically assembled in a way to determine if Resource's need training or more management. Performance information assembled into Peer Listings containing specific non-controvertible information is a key to Invention's powerful Productivity enhancement, i.e. it is known that what we measure fairly and compare for resource performance will naturally stimulate reasonable completion and attempts by resources to meet new goals and try harder to be the best or at least achieve a personal best level. For these resources performing at levels below those expected and/or not performing work tasks per sequences as specified per the Process Steps, management is provided appropriate metrics-based information for it to use as it see fit.
2. For steps/task in Processes: If a step/task has a flaw in its engineering of requirements for a resource, it will show up in the comparative analysis built into the Invention's reports via the DMDS© as not meeting Service Levels and can be adjusted. Also, issues as covered above, are cross referenced to steps/task and over time the incidence of them for the same step is detected by the Root Cause analysis algorithm and can be "rooted out" and re-engineered.
3. For Event effectiveness: Events that slip schedule or budget show up on the periodic reporting (normally weekly) and on management Dashboards and emails as they occur. This permits a three-way analysis of why work Event performance may have slipped: (1) Resource performance slipped due to reported issues/problems or other HR issues, (2) reported task issues indicate need for improvements in the step/task design of a Process or (3) the Process itself may need re-engineering. Over time this continual analysis and "Learning Loop" in the Invention drives up the Quality of all Enterprise Processes, steps/tasks and resource performance by tightening down the Processes to eliminate mistakes, which is another major element in driving up Productivity and down Event Failures.
4. For the Processes themselves: Steps/Tasks with continuously occurring issues/problems show up in comparative analysis Metric reports. When the number of such exceptions exceed normal limits, a review of Process is ordered, requiring a Process-use effectiveness study with possible outcome of re-engineering of the Process or simply causing the need to clone the Process and make it more specific to Events that use it and have problems due to missing steps/tasks or other Process component deficiencies. Other remedies are available to alter and adjust the Process per above discussions to eliminate the issues and increase resource ability to carry the Process out within SLA's and Project schedules.

Since work Events are being executed according to Processes approved by appropriate management levels using the Invention's Governance techniques, steps/tasks can be added that resources have often forget, overlooked or simply not done in the past including proper Time keeping itself can be assured that they will be done or they will know why not via issue reporting. Some of the vital new steps/tasks that can be added to Processes to improve their efficiency and effectiveness of the Event completion process are as follows:
1. Risk Assessment, measurement and avoidance steps/tasks for Risk mitigation.
2. Customer Satisfaction via prescribing customer satisfaction survey questions as steps/tasks, sequencing steps/tasks to provide customer feedback and to some degree collaboration on Event completions.
3. Communication improvements via the automatic emails for real-time management awareness of Process detected anomalies and reported issues that appear on Web Dashboard pages as well as Metric reports. This is a key feature in that timely reporting the appropriate levels of management issues that may impact either performance, cost or time to complete gives management the time to take corrective actions before disasters occur.

Since the Invention automates Process implementation via its PVE for the entire Enterprise, Global resource use and performance comparisons facilitate comparison of the effectiveness of resources globally. This information can "level the playing field" of cost vs. performance resource selection and improve resource selection for specific work Events versus standard availability and cost only parameters. Given Invention functionality as elaborated above also can facilitate taking proven "Mature Processes" that work in one region of the world and modify them to deal with known cultural differences, time zone issues, international law requirements and other differences in Process needed by the modern Enterprise dealing in Global business to support the Global Enterprise complexities of the not to distant future. Here the Root Cause Analysis and automatic "Continuous Improvement" algorithms of the Invention can pay huge dividends in resource use and completing work Events on-schedule, on-budget and delivering the consistency provided by its Process Governance on a Global scale.

The Invention's internal algorithms contain the logic to use operational data and performance data to form Metric trends that address the need for better estimates on Strategic Projects. Estimates guide funding, expectations and schedules on which the Enterprise can base its Strategic future successes. These projects then have a critical need and success requirement, i.e. Projects and work Events tied to Strategic Objectives representing the very life blood of the Enterprise. Given the historical Data Base that the Invention assembles as it operates this Data Base becomes available for this Strategic Project Estimating requirement and then uses its Governance and Metrics features to aid management in raising the odds to near 100% that these Strategic Projects will complete properly.

Once approved, Strategic Projects become work Events and the PVE cycle is launched to apply proven Processes to them. The PVE enforces the Governance of the Process implementation per the above descriptions resulting in management metrics and information available on management's Dashboards which operate like a "scoreboard" for management to use to guide them to guaranteed success with increased Productivity in all that is done under the Invention's Governance and PVE engine.

The Value proposition for the invention's features can be quickly seen in the following two examples and there are hundreds more that could be iterated:
1. A ten Billion dollar Enterprise (not that large in current corporate world) with a 10% project budget for new projects has a budget of one billion dollars for projects. If they incur a 25% failure rate that is $250 million loss (current Industry media states categorically that 25% is the current project failure rate). If the Invention cuts that by only 50% and a vigorous implementation of its functionality should be able to exceed that number, it can be seen to be able to save corporations hundreds of millions of dollars on project Failure expense alone.

2. The Invention addresses Project trouble also with its "real-time" feedback systems of Web Portal/Dashboards and automatic emails the real-time issues and trouble is reported. Using the same example Enterprise as above, if 75% of the projects are in trouble (here again Industry media report 75% is the correct number) then the Enterprise faces the prospect of a $750 million potential loss due to project issues. Again, a 50% cut is a dramatic number showing the need for the Invention to mitigate these horrendous Risk numbers.

Moreover the adverse affect of failed and late over-budget projects on achievement of Strategic Goals based on them can be significant. The Invention is targeted to help an organization radically mitigate project risks.

Other features of the Invention are the following:

1. Allow for the strategic goals of improving work Event effectiveness. Goals may to be set and performance toward them measured. Management can achieve huge productivity and financial improvements by re-engineering process and using the cycles of evaluation and performance improvement built into the Invention. Once the Processes mature and resources are trained in the Invention, higher productivity is achieved due to the fact that the Invention delivers the information needed to have early visibility to potential event failures (Industry media reports current levels of 25% project failures), locate off-schedule and off-Budget Events early (Industry media has current level of 75% Projects with these maladies). Not only does the action Metrics help early detection by being cross referenced to the Event Step and resource in trouble versus historical use of the Process, it leads to better mitigation and appropriate response to the problem by management.
2. Another entire "region" of the invention is Performance evaluations of all resources using the Invention within one Enterprise. As stated above the Invention can look at the largest pool of resources conceivable worldwide for an Enterprise with known Organizational and Security information for their comparative performance Levels. This can assist in the HR elements of doing Global work Events through multi-locations and multi-cultural teams.
3. Process use with comparatives to effectiveness, Service Levels and to themselves via historical views is one of the standard features of the Invention that allows for resource performance comparisons from current levels to historical levels to latest new technology levels. Best Practice Data Bases and Risk Data bases can be continuously adjusted and added from Industry and professional sources to further increase the interpretation of performance information on a global scale.
4. Invention's "forensic" level of evaluation information for steps/tasks of the Processes on the highest and lowest instances of success ratios with them leads to re-engineering efforts and/or additional information on them to increase productivity and success ratios.
5. Resource effectiveness cross referenced to Process and Events leads to locating the Enterprises real producers versus those who worked a lot of hours but were not effective and caused project budget and schedule issues. The Invention's cross referencing and indexing to historical data of all resources purifies the data. This information can be used by management to bootstrap and improve performance of resources not performing to predicted or acceptable standards.
6. Event completions comparisons and cross referenced to resources shows if the "right Work" is being done by the right resources at the right time. The Time Analysis produces multiple graphical charts on demand which can tell a senior/experienced manager/executive almost at a glance if the work Event performance of a Team, Project or entire IT organization is in line with planning both in terms of percentage of resources to specific work Effort areas and operations versus development goals.
7. Team Lead performance cross referenced to Process, steps/tasks and resources provides management with the information needed to make decisions on team formations and allows for dynamic team creation for large Events from available resources planned months ahead using the data provided in the Invention Metrics projections which uses the Process estimates for resource requirements which will be enforced through Invention Governance activities.
8. Event delivery as used to justify more risk in bigger projects that hold bigger paybacks for the Enterprises applying the Invention over substantial time periods and accumulating a substantial set of historical project information.
9. Event Failures for new operational Risks unforeseen in Risk Assessment can be detected very early due to Performance Metrics from Process Step/Task estimates versus actual as reported in time entry and time to complete.
10. Risk cross referenced to Processes, Events, Risk to form Risk Banks and steps/task check point definitions to be placed into Process to enforce mitigation and lower loss due to known Reports are no longer guess work of well meaning Project Managers they are the accumulated results that are occurring in real-time with the Invention's Metric availability through the Dashboards and/or reports. When known Processes are applied to work Events and the effort measured precisely so that predictions and Risk evaluation are possible, failures will go down and successes and productivity will go up.
11. The Invention has API's so that most modern PM systems can be interfaced along with Microsoft Project Server 2003 (their latest).
12. The Invention has API's so that most modern Help Desk systems can be interfaced for Managed Maintenance© and Cunstruction Management© type activities to it. The Processes for CAI's Managed Maintenance are included in the Process Library provided with the basic Invention installation set).

Another statement on the uniqueness of this software Invention is not only that it can provide the Metrics to detect Events in trouble in time to "right the ship" and bring Project and work Events to a successful completion, but long term use of it and its automated continuous improvement "Best Practices" implemented via the built-in Process Lifecycle algorithms and historical Data Base lowers the "Risk Variable". This reduces the Enterprise Project failure risk by a huge percentage for as long as the Invention continues to be applied and improved through its "Learning Loops" reflected in the Process Library Processes and historical Data Base of past performance on work Events and Projects.

Uniqueness

1. ARCHITECTUAL Design to implement Process Automation

The present invention uses a designed "from the ground up" internal Architecture for implementing an OOP System Flow from UI Pages thru its "Action Processing Engine"©, which includes an Action Condition (AC) analyzer component and an Action Operation (AO) Decision processor. Business Objects (BO) are process by its "Action Processing Engine"©, as well as Data Management Engine to access full SQL DB with 100% SP processing according to rules from AO's and BO's and built in where appropriate. The process operates in reverse to genera rate the UI Page with Response. Due to this DB Design Engine approach other DB's like Oracle can replace SQL with system rewrite.

All the words on all of the Web Pages are on the Data Base so the Architecture assembles the entire Page for viewing from the data requirements needed dynamically based on Business rules, which also are all stored in the DB making for this powerfully flexible process to generate what it needs to display on the fly based on the data and conditions and Process being used. This design radically reduces support cost and makes it quite easy to plan for more versions as it evolves to further meet client demands.

No other Software system known to us in the World uses this Architecture driven Process approach, which implements 7 technologies and languages working together to create a dynamic data flow needed to support the parametric Process features.

The Architecture also supplies OOP methods in XML and XSLT for internal Page constructs and Transformations to make Pages "morph" to the demands of the data not the reverse as in most current technology on Web based system. By creating, a data driven system the Architecture is further enabling the flexibility to implement Process Automation as described above.

Page components like Grids, Buttons Actions and other components are generated on the fly by the Architecture allow for a tremendous amount of flexibility and scalability to the systems ability to deal with small Process Automation for a few Teams or a full multi-national corporations with 100's of Resources, Managing Organizations etc.

2. PVE Engine

The uniqueness is not limited to its PCM (Process Change Management) but also to its Process Validation Engine (PVE) that processes the PCM Process Templates Dynamically from what every number of Resources are assigned tasks within it scope. Following processing the PVE determines "What's Next"© for each resource and to keep track of what's been done for reporting and evaluation later.

The PVE then sends instantly to the Resources "What's Next"© in the form of Process Steps/Tasks that appear on their Dashboard as "What's Next"© or in the proper order given the priorities and schedules of all their other assigned tasks. Their screens change dynamically as they display them so they are continuously and constantly doing the proper "What's Next"©. Again, this is new ground-breaking development versus the old style To Do systems that used Checklist and fixed Schedules not based of the Process needs of the moment, but the preconceived or static Process of the "Drawing Board" or even current Computer Schedule/List Systems, which show Project Schedules. They are not doing the appropriate "What's Next"©, based on the Process and conditions of the moment but on the ingrained steps put into the Schedules in a vacuum. Productivity and Quality are lost when the needs of the current Process are different from the pre-conceived Project Schedule and time is wasted either doing the wrong thing or trying to figure out "What's Next"©, as the invention does automatically from the Process alternate actions and its PVE Engine.

Thus, the present invention will change the nature of operations and information processing to produce higher Productivity and Quality because it is responding to today Process not last Years, last week or even yesterday's Project Schedule.

3. Levels of Implementation

Three Levels are provided. The first is called Basic. It comes with a built-in Process for an IT department to use to Support a Software product with it and get full Metrics on what's going inside their support. This process can be implemented in a few weeks for a 50 person team and in a month for a very large corporation. The in-house IT people are shown how to use and manage the system through a wide range of Training Options. (even this Basic Process can be modified with PCM to make it even easier for an Organization to get started; this is supplied during Installation planning and Deployment. Optional Services are available for what ever amount of assistance client needs).

Once Basic is installed and Metrics are available, CAI Consultants help the client to evaluate the results and plan their own Process Improvements and further use of other features to improve their effectiveness. Then, when the client is ready they can move to Level 2—called Advanced to begin to use of their own new Processes and Improved process WITHOUT ANY CONVERSIONS OR LOST work from their use of Basic. In fact, their use of Basic has prepared them for Advanced. CAI also offers Training services for "Process Engineering" and "Configuration Engineering" should the client wish to use them.

Once fully on advanced, the client begin to consider moves like trying to implement 6 Sigma Process or CMM or other major steps forward in Process Development and implementation depending on the degree of Productivity improvement they want and the Quality levels they need. This offer will use the CAI schooling and Training Options are can be done in conjunction with other client activities in 6 Sigma or other Construction Initiatives.

4. The "Action Processing Engine"© allows for connection to other modules that are Auxiliary Functions or extensions that can be applied to the reporting and data available for use in PCM Process planning.

These include:

a. Project Management Office—which can access Projects under Process control and report on them from stand Project Portfolio analysis and compare broad Project Objectives to Strategic Plans and other PMO concepts b. Skills Inventory—The invention can have a standard list of data items needed to put Resources "in play" doing Tasks and playing their roles in Process. This information when joined with Skills information can provide Corporations a view of the Long Term Resource needs as well as assess the current Resource "fitness" for Projects being controlled by current Processes.

c. Any Project at anytime can be pushed out thru the Project Management Interface to a Project Management system like Microsoft Project 2002 for generation of reports. This also works with the Skills Module, i.e. Resources assigned to these Projects can be Resource Leveled in Master Project Settings of Enterprise Resource studies done form over all data.

d. Crystal Reports capability to generate any report on the nearly 400 Tables of information about Processes, Events, Resources, Management Organizations, Customer Organizations, Skills, Projects etc is a way to see immediate the unique information about the unique Processes and projects that corporations have which heretofore was always the worst part, i.e. the information was in their but another system or Data Banks or other artificial means and costs were need to extract the vital information inside the systems. The invention ends all that with built in Metrics that can be cloned and changed in Crystal for custom reports that also extends to Auxiliary functions.

5. Estimating
6. Quality Control and Quality Assurance Management Built-In
7. Built in perfected Metrics, SLA's and Comparisons to Best Practices that adapt via PCM, PVE and Crystal Reporting
8. Process Enforcement to achieve CMM, ISO and what ever standards appropriate
9. Layer Technology to ensure long term maintainability
10. Comparative Performance that allows for Personnel management change in perspectives. People can monitor their own performance and due to consistent implementation of Process across the board the data is more "honest and fair" and people will respond to it with vigor.
11. Ability to do Resource Planning rose to level not conceived of due to presence of data not only on what on the schedule, but on Resources required by Process for the Season, period or particular needs of the business.
12. Issue and Problem management that integrates with SLA's to mitigate and permute fair play. Automatic Process application to unexpected Problem Occurrence to conform to Risk and Management Escalation plans not guess work which leads to failure and law suits.
13. Besides it value to business to impalement Process PCM is valuable tool for regulated industries to prove compliance
14. PCM Process means Budgets have more meaning and EV results can be improved into Process not just anecdotal Historical Project Information. Proper Process Enforcement through continuous measurement and improvement spells Safety for situation where the Process must be followed, e.g. Nuclear Engineering, Bacteriological Sciences.

BRIEF DESCRIPTION OF THE DRAWINGS

A preferred embodiment of the present invention will be set forth in detail with reference to the drawings, in which.

DETAILED DESCRIPTION OF THE PREFERRED EMBODIMENT

Figure 1:
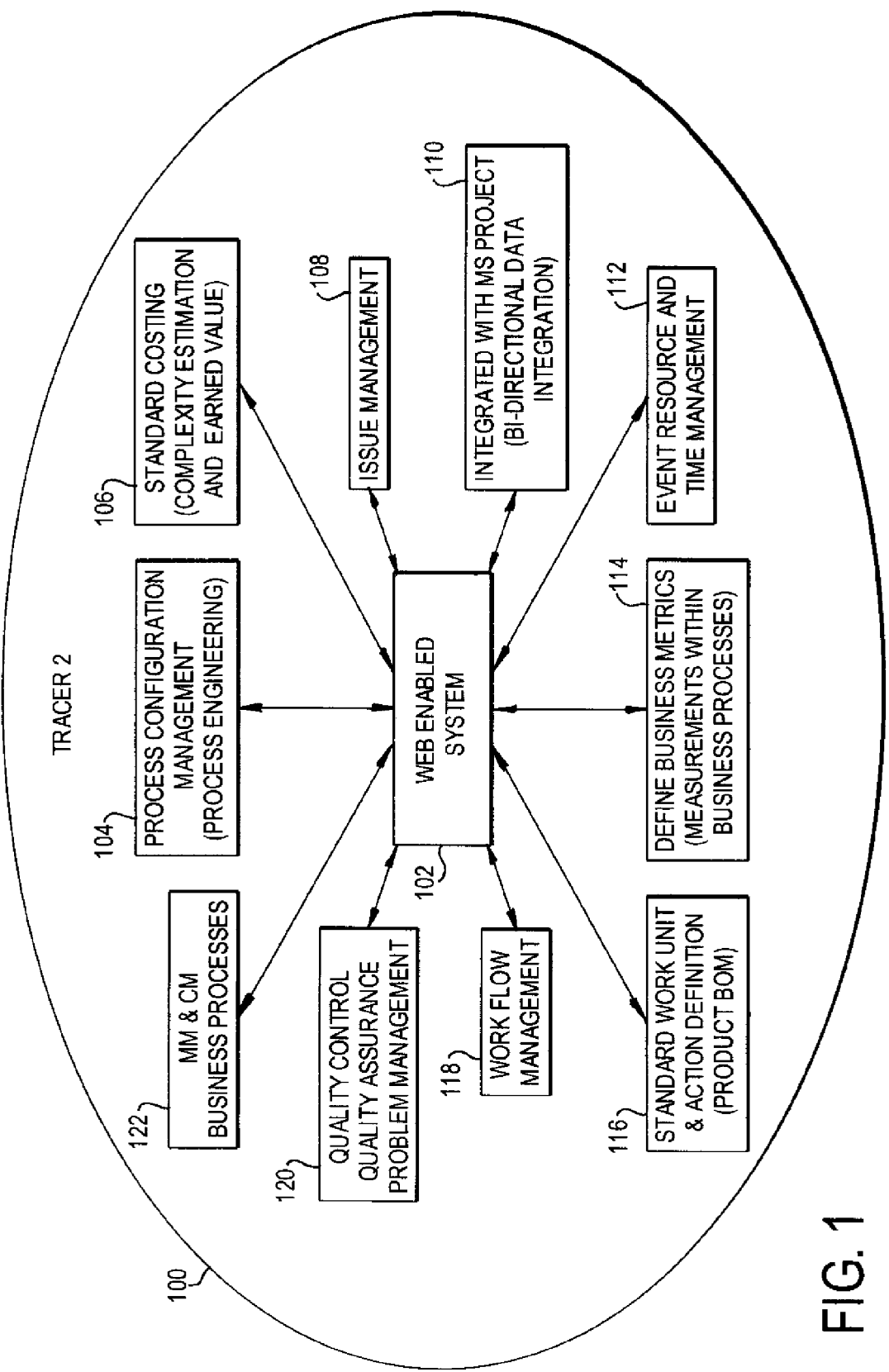
FIG. 1 shows a conceptual overview of the preferred embodiment.

FIG. 1 shows a conceptual overview 100 of the preferred embodiment. As seen in FIG. 1, the various features of the preferred embodiment are tied together by a Web-enabled system 102 which allows users to access the system from thin clients and more generally from any clients capable of running a sufficiently up-to-date Web browser. There is thus no need for end users to run proprietary software or to use computers sufficiently powerful to run such software. The features tied together by the Web-enabled system include process configuration management 104, standard costing and earned value 106, issue management 108, integration 110 with a standard project-management package (such as Microsoft Project, although that example is illustrative rather than limiting), event resource and time management 112, business metrics definition 114, standard work unit and action definition 116, work-flow management 118, quality control, quality assurance and problem management 120, and MM and CM business processes 122.

Figure 2:
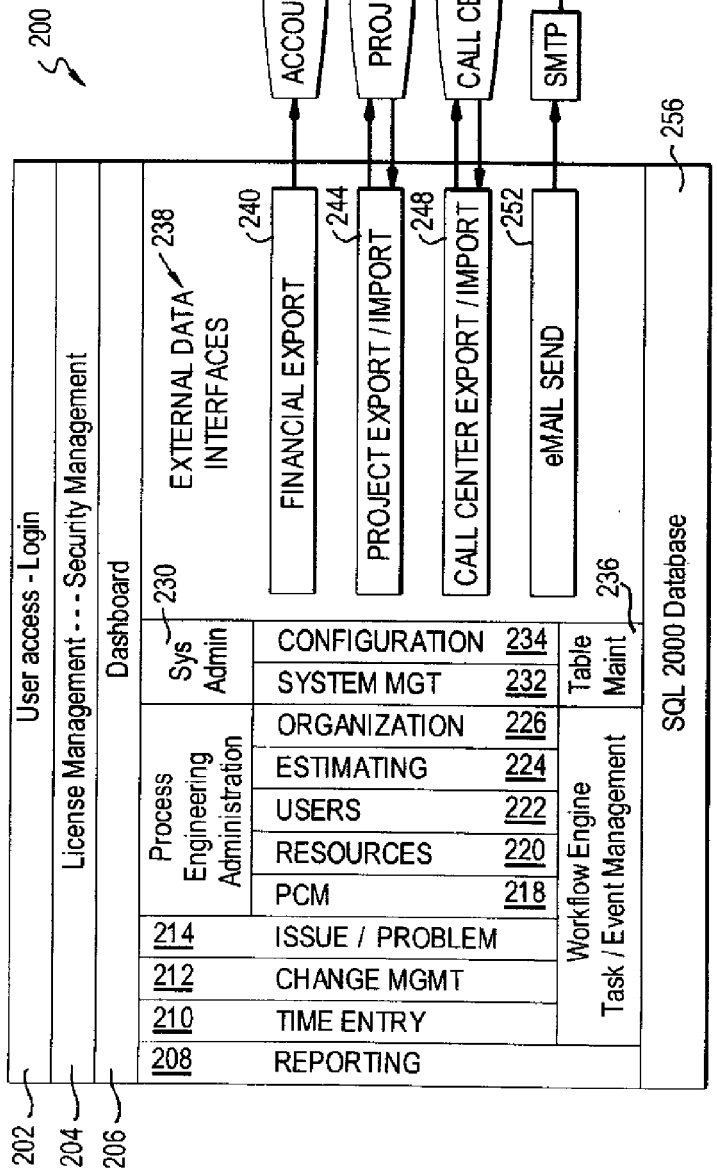
FIG. 2 shows a system model overview of the embodiment of FIG. 1.

A system model overview 200 is shown in FIG. 2. User access and login 202, license and security management 204, and a dashboard 206 (i.e., a user interface, to be explained in detail below) are all Web-enabled, so that they can function on the end user's computer with no need to install proprietary software.

The end user's thin client connects to a server which performs the following functions. The end user can access some or all of the functions in accordance with that end user's level of permission in the system.

The functions include reporting 208, time entry 210, change management 212 and issue/problem management 214. They also include process engineering administration 216, which includes process control management 218, resource management 220, user management 222, estimating 224, and organization management 226. Of the above functions, time entry 210 through organization management 226 are implemented through a workflow engine 228 which provides task/event management.

Still another function which can be performed through the dashboard, if the user has sufficient permission, is system administration 230, including system management 232 and configuration 234, both of which are performed through a table maintenance engine 236.

The system further includes external data interfaces 238 for exporting data to, and in certain cases importing data from, databases external to the system. Those interfaces include financial export interface 240 for exporting data to an accounting system 242, project export/import interface 244 for exporting/importing data to/from a project management system 246, a call center export/import interface 248 for exporting/importing data to/from a call center system 250, and an e-mail send interface 252 for exporting data to an SMTP (simple mail transfer protocol) server 254 to control the SMTP server 254 to send e-mail.

All of the above functionality is implemented using a SQL 2000 database 256, or other suitable database.

Figure 3:
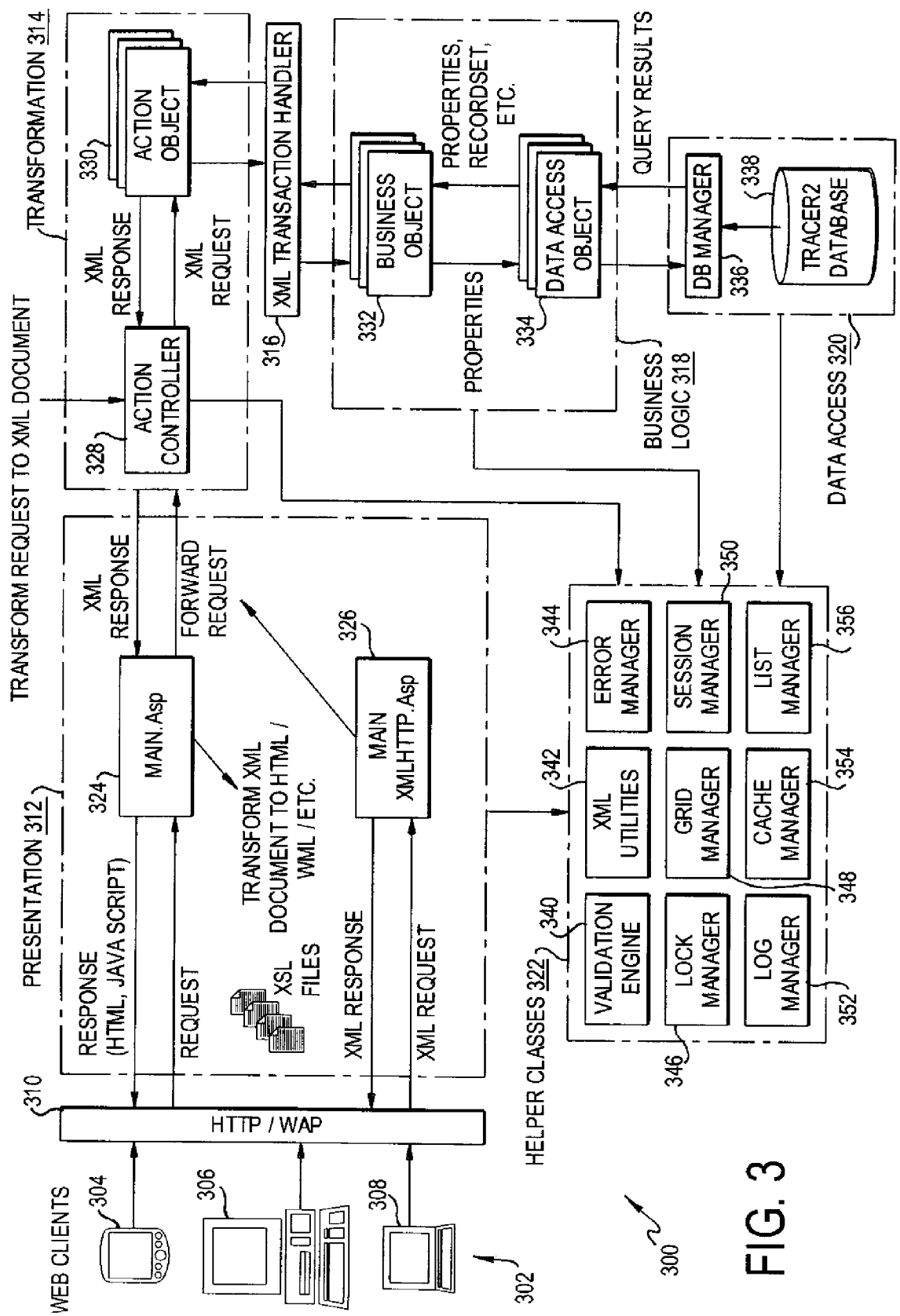
FIG. 3 shows a technical architecture for implementing the system of FIG. 2.

The technical architecture for implementing the system just described will now be described with reference to FIG. 3. As noted above, the technical architecture 300 permits users to interface with the system as thin clients, using a variety of Web client devices 302 which can vary widely in terms of processing power and support for varying degrees of complexity of the accessed HTML pages. Such Web clients can, by way of example, include PDA's 304, desktop computers 306, laptop computers 308, and Web-enabled second- or third-generation cellular telephones (not shown).

The technical architecture 300 includes the following modules: an HTTP/WAP interface module 310, a presentation module 312, a transformation module 314, an XML transaction handler 316, a business logic module 318, a data access module 320, and helper classes 322. Each of the modules will be described in turn.

The HTTP/WAP interface 310 allows the users' Web clients 304 to access the technical architecture 300. It provides a simple interface, including the dashboard, to be explained in detail below.

The presentation module 312 includes a process Main.Asp 324 and a process MainXMLHTTP.Asp 326. The process Main.Asp 324 receives requests from the users' Web clients 304 through the HTTP/WAP interface 310 and forwards them to the transformation module 314. The process Main.Asp 324 also receives XML responses from the transformation module 314, formats them into a desired format such as HTML or Javascript, and sends the responses to the users' Web clients 304 through the HTTP/WAP interface 310.

The process MainXMLHTTP.Asp 326 receives XML requests through the HTTP/WAP interface 310, forwards those requests to the transformation module 314. XML responses are received by the process Main.Asp 324, which transforms them and supplies them to the process MainXM-LHTTP.Asp 326 for forwarding back to the users.

The transformation module 314 includes an action controller 328 and action objects 330. The action controller 328 receives requests from the presentation module 312 and returns XML responses to the presentation module 312. The action controller 328 transforms requests into XML documents, forwards the XML requests to the action objects 330, and receives XML responses from the action objects 330.

The XML transaction handler 316 handles XML transactions between the transformation module 314 and the business logic module 318.

The business logic module 318 includes business objects 332 and data access objects 334. The business objects 332 receive requests from the auction object 330 through the XML transaction handler 316 and pass properties to the data access objects 334, which formulate a query for the data access module 320. Results from the data access module 320 are received in the data access objects 334, which pass properties, record sets and the like to the business objects 332. The business objects 332 pass that information through the XML transaction handler 316 to the action objects 330.

The data access module 320 includes a database manager 336 and a database 338. The database manager 336 handles queries from the data access objects 334 to the database 338 and results from the database 338 to the data access objects 334.

The helper classes 322 receive inputs from the presentation module 312, the transformation module 314, the business logic module 318 and the data access module 320. The helper classes 322 include a validation engine (PVE) 340, XML utilities 342, an error manager 344, a lock manager 346, a grid manager 348, a session manager 350, a log manager 352, a cache manager 354, and a list manager 356. As explained above, the PVE determines which use should perform which tasks and in what order of importance.

Figure 4:
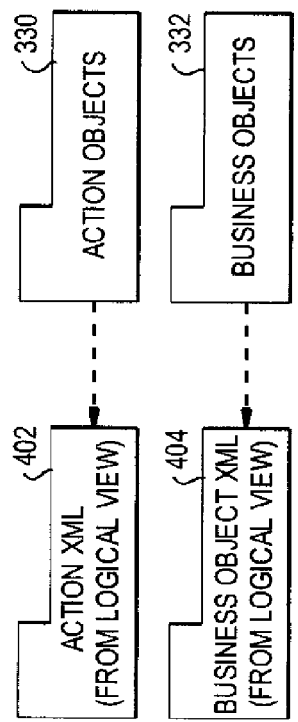
FIG. 4 shows a top-level view of the action objects and the business objects of FIG. 3.

FIG. 4 shows a top-level view of the action objects 330 and the business objects 332, with their relation to action XML 402 and business object XML 404. This will be explained in detail below.

Figure 5:
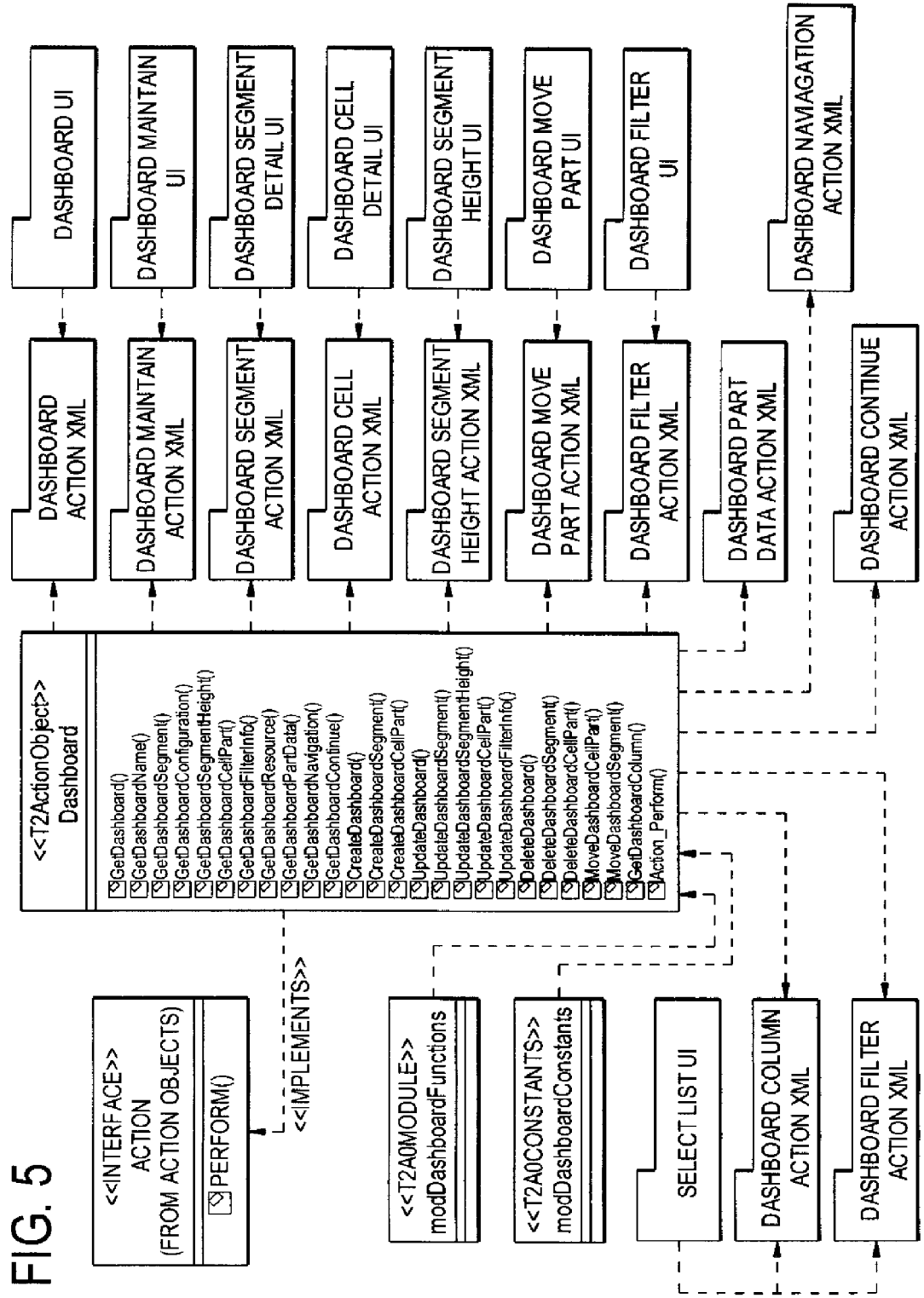
FIG. 5 shows a use case diagram of the dashboard.

FIG. 5 shows a UML use case diagram of the dashboard 206. The dashboard 206 is an online Web page providing a user interface in which each user can see that user's assigned work in order of importance. The description is as follows:

Classes

Dashboard <<T2ActionObject>>
Documentation: Action Object Dashboard component used to handle the processing of UI requests related to the dashboard.

Attributes:
N/A

Operations:
GetDashboard : String
Parameters:
strOperation : String
strSessionId : String
strName : String
strFormData : String
Documentation:
Executes a transaction to retrieve the layout (parts, cells, segments) for a given user's dashboard
GetDashboardName : String
Parameters:
strOperation : String
strSessionId : String
strName : String
strFormData : String
Documentation:
Executes a transaction to retrieve the name for a given user's dashboard
GetDashboardSegment : String
Parameters:
strOperation : String
strSessionId : String
strName : String
strFormData : String
Documentation:
Executes a transaction to retrieve the layout for a particular segment within a given user's dashboard
GetDashboardConfiguration : String
Parameters:
strOperation : String
strSessionId : String
strName : String
strFormData : String
Documentation:
Executes a transaction to retrieve the domain's current dashboard configuration information
GetDashboardSegmentHeight : String
Parameters:
strOperation : String
strSessionId : String
strName : String
strFormData : String
Documentation:
Simply sends back the dashboard segment height action xml as is. No transaction is needed to call for this action.
GetDashboardCellPart : String
Parameters:
strOperation : String
strSessionId : String
strName : String
strFormData : String
Documentation:
Executes a transaction to retrieve the details about one part within a dashboard cell and segment
GetDashboardFilterInfo : String
Parameters:
strOperation : String
strSessionId : String
strName : String
strFormData : String
Documentation:
Executes a transaction to retrieve the filter and sort information for a dashboard segment cell part
GetDashboardResource : String
Parameters:
strOperation : String
strSessionId : String
strName : String
strFormData : String Documentation:
Executes the GetAOList method to get the list of authorized resources for the current user. This method helps in the display of the Assignee Popup for filter criteria.
GetDashboardPartData : String
Parameters:
strOperation : String
strSessionId : String
strName : String
strFormData : String
Documentation:
Executes a transaction to retrieve the data for one part within a dashboard cell and segment
GetDashboardNavigation : String
Parameters:
strOperation : String
strSessionId : String
strName : String
strFormData : String
Documentation:
Executes a transaction to retrieve the name for a page to navigate to from within the dashboard
GetDashboardContinue : String
Parameters:
strOperation: String
strSessionId : String
strName : String
strFormData : String
Documentation:
Executes a transaction to retrieve the details for a dashboard part line item.
CreateDashboard : String
Parameters:
strOperation : String
strSessionId : String
strName : String
strFormData : String
Documentation:
Executes a transaction to create a new user's dashboard
CreateDashboardSegment : String
Parameters:
strOperation : String
strSessionId : String
strName : String
strFormData : String
Documentation:
Executes a transaction to create a new user's dashboard segment
CreateDashboardCellPart : String
Parameters:
strOperation : String
strSessionId : String
strName : String
strFormData : String
Documentation:
Executes a transaction to create a new part for a dashboard segment cell
UpdateDashboard : String
Parameters:
strOperation : String
strSessionId : String
strName : String
strFormData : String Documentation:
Executes a transaction to update a given user's dashboard
UpdateDashboardSegment : String
Parameters:
strOperation : String
strSessionId : String
strName : String
strFormData : String
Documentation:
Executes a transaction to update a given user's dashboard segment
UpdateDashboardSegmentHeight : String
Parameters:
strOperation : String
strSessionId : String
strName : String
strFormData : String
Documentation:
Executes a transaction to update a given user's dashboard segment height after updating a dashboard cell.
UpdateDashboardCellPart : String
Parameters:
strOperation : String
strSessionId : String
strName : String
strFormData : String
Documentation:
Executes a transaction to update a part for a dashboard segment cell
UpdateDashboardFilterInfo : String
Parameters:
strOperation : String
strSessionId : String
strName : String
strFormData : String
Documentation:
Executes a transaction to update a given user's dashboard segment cell part filter criteria
DeleteDashboard : String
Parameters:
strOperation : String
strSessionId : String
strName : String
strFormData : String
Documentation:
Executes a transaction to remove a given user's dashboard
DeleteDashboardSegment : String
Parameters:
strOperation : String
strSessionId : String
strName : String
strFormData : String
Documentation:
Executes a transaction to remove a given user's dashboard segment
DeleteDashboardCellPart : String
Parameters:
strOperation : String
strSessionId : String
strName : String
strFormData : String Documentation:
Executes a transaction to remove a part for a dashboard segment cell
MoveDashboardCellPart : String
Parameters:
strOperation : String
strSessionId : String
strName : String
strFormData : String
Documentation:
Executes a transaction to move a part for a dashboard segment cell to another dashboard segment cell
MoveDashboardSegment : String
Parameters:
strOperation : String
strSessionId : String
strName : String
strFormData : String
Documentation:
Executes a transaction to move a given user's dashboard segment up or down
GetDashboardColumn : String
Parameters:
strOperation : String
strSessionId : String
strName : String
strFormData : String
Documentation:
Executes a transaction to retrieve the column filter data for a dashboard segment cell part
IAction_Perform : String
Parameters:
strSessionId : String
strHandler : String
strName : String
strInput : String
strFormData : String
Documentation:
Perform : String
Parameters:
strSessionId : String
strHandler : String
strName : String
strInput : String
strFormData : String
Documentation:

modDashboardConstants <<T2AOConstants>>
Documentation: Action Object constants used to define transactions, actions, operations and other constants in the Dashboard AO.

Attributes:
NODE_COLLECTION : String
Documentation: Collection node constant for DashboardPart
TRANS_GETDASHBOARD : String
Documentation: Transaction constant for GetDashboard
ACTION_DASHBOARD : String
Documentation: Action constant for Dashboard
ACTION_DASHBOARDCUSTOM : String
Documentation: Action constant for DashboardCustom
DASHBOARDPART : String
Documentation: Collection node constant for DashboardPart
TRANS_GETDASHBOARDNAME : String
Documentation: Transaction constant for GetDashboardName
ACTION_DASHBOARDMAINTAIN : String
Documentation: Action constant for DashboardMaintain
TRANS_GETDASHBOARDSEGMENT : String
Documentation: Transaction constant for GetDashboardSegment
ACTION_DASHBOARDSEGMENT : String
Documentation: Action constant for DashboardSegment
ACTION_DASHBOARDCELL : String
Documentation: Action constant for DashboardCell
TRANS_GETDASHBOARDCONFIGURATION : String
Documentation: Transaction constant for GetDashboardConfiguration
OPERATION_GETCONFIGURATION : String
Documentation: Operation constant for GetConfiguration
TRANS_GETDASHBOARDSEGMENTHEIGHT : String
Documentation: Transaction constant for GetDashboardSegmentHeight
ACTION_DASHBOARDSEGMENTHEIGHT : String
Documentation: Action constant for DashboardSegmentHeight
TRANS_GETDASHBOARDCELLPART : String
Documentation: Transaction constant for GetDashboardCellPart
ACTION_DASHBOARDMOVEPART : String
Documentation: Action constant for DashboardMovePart
TRANS_CREATEDASHBOARD : String
Documentation: Transaction constant for CreateDashboard
TRANS_CREATEDASHBOARDSEGMENT : String
Documentation: Transaction constant for CreateDashboardSegment
TRANS_CREATEDASHBOARDCELLPART : String
Documentation: Transaction constant for CreateDashboardCellPart
TRANS_UPDATEDASHBOARD : String
Documentation: Transaction constant for UpdateDashboard
TRANS_UPDATEDASHBOARDSEGMENT : String
Documentation: Transaction constant for UpdateDashboardSegment
TRANS_UPDATEDASHBOARDSEGMENTHEIGHT : String
Documentation: Transaction constant for UpdateDashboardSegmentHeight
TRANS_UPDATEDASHBOARDCELLPART : String
Documentation: Transaction constant for UpdateDashboardCellPart
TRANS_DELETEDASHBOARD : String
Documentation: Transaction constant for DeleteDashboard
TRANS_DELETEDASHBOARDSEGMENT : String
Documentation: Transaction constant for DeleteDashboardSegment
OPERATION_DELETESEGMENT : String
Documentation: Operation constant for DeleteSegment
TRANS_DELETEDASHBOARDCELLPART : String
Documentation: Transaction constant for DeleteDashboardCellPart
TRANS_MOVEDASHBOARDCELLPART : String
Documentation: Transaction constant for MoveDashboardCellPart
TRANS_MOVEDASHBOARDSEGMENT : String
Documentation: Transaction constant for MoveDashboardSegment
OPERATION_MOVE : String
Documentation: Operation constant for Move
TRANS_GETDASHBOARDFILTERINFO : String
Documentation: Transaction constant for GetDashboardFilterInfo
ACTION_DASHBOARDCUSTOMPART : String
Documentation: Action constant for DashboardCustomPart TRANS_UPDATEDASHBOARDFILTERINFO : String
Documentation: Transaction constant for UpdateDashboardFilterInfo
TRANS_GETDASHBOARDCOLUMN : String
Documentation: Transaction constant for GetDashboardColumn
ACTION_DASHBOARDCOLUMNPOPUP : String
Documentation: Action constant for DashboardColumnPopup
TRANS_GETDASHBOARDRESOURCE : String
Documentation: Transaction constant for GetDashboardResource
ACTION_ASSIGNEEPOPUP : String
Documentation: Action constant for AssigneePopup
TRANS_GETDASHBOARDPARTDATA : String
Documentation: Transaction constant for GetDashboardPartData
ACTION_DASHBOARDPARTDATA : String
Documentation: Action constant for DashboardPartData
TRANS_GETDASHBOARDNAVIGATION : String
Documentation: Transaction constant for GetDashboardNavigation
ACTION_DASHBOARDNAVIGATION : String
Documentation: Action constant for DashboardNavigation
TRANS_GETDASHBOARDCONTINUE : String
Documentation: Transaction constant for GetDashboardContinue
ACTION_DASHBOARDCONTINUE : String
Documentation: Action constant for DashboardContinue Operations:
N/A modDashboardFunctions <<T2AOModule>>
Documentation: Action Object functions used to define common functions to handle
UI processing
with in the Dashboard AO.

Attributes:
N/A

Figure 6:
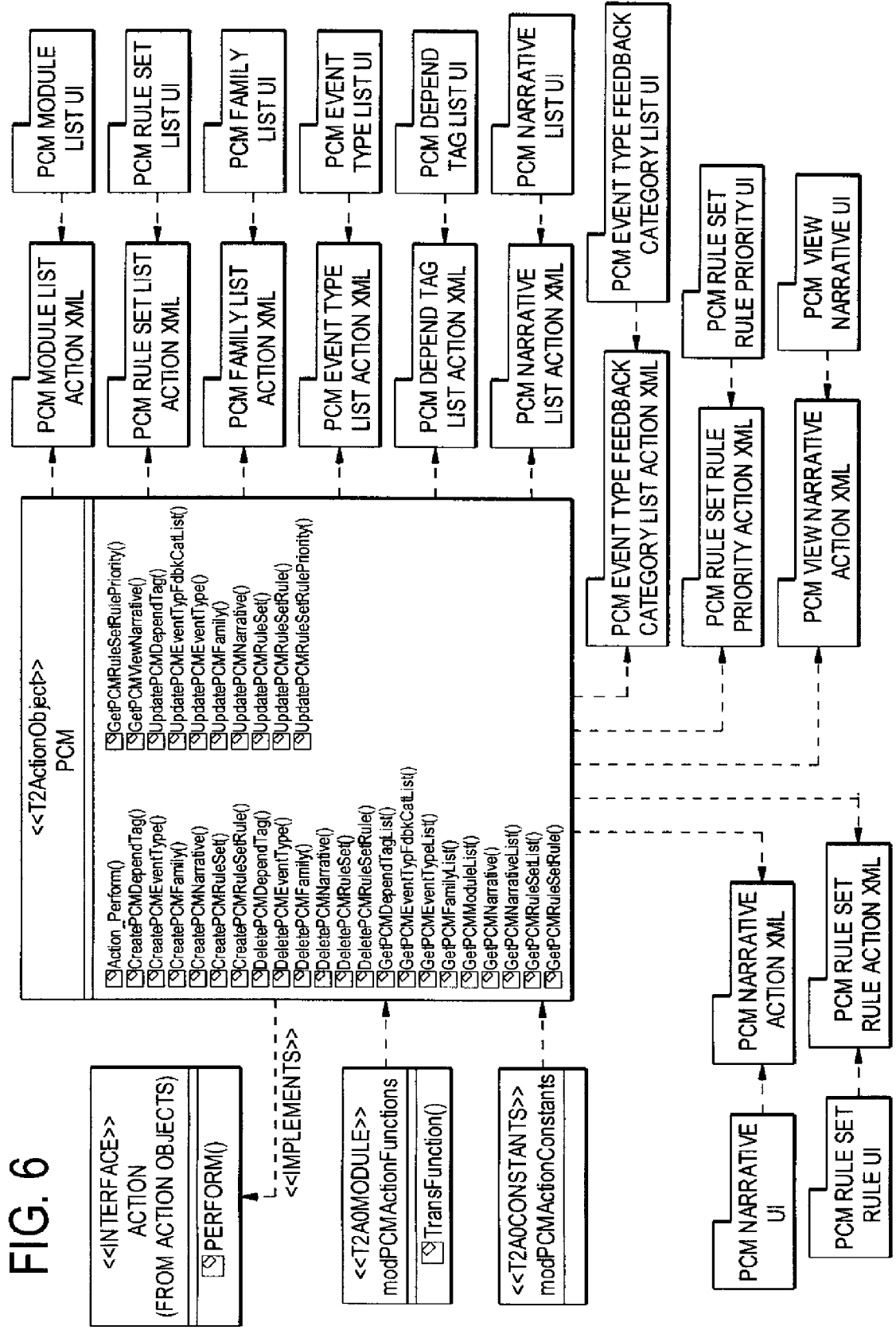
FIG. 6 shows a use case diagram of the PCM.

Operations:
TransFunction : String
Parameters:
strFunctionName : String
strDataIn( ): Variant
Documentation:
Section: Public Function TransFunction( )
Purpose: This method calls any proprietary functions that need to be called before processing begins.
Inputs: strDataIn String—Value of data to be manipulated. i.e. (1;1)
strFunctionName String—Function name to be called. i.e. (GetDomain)
Returns: String—The value that will be returned by the proprietary function. i.e. (1)
Effects: N/A Sub Packages Dashboard Action XML
Documentation: Contains the Dashboard Action XML/XSL classes Dashboard UI
Documentation: Contains the Dashboard Display UI classes Dashboard Segment Action XML
Documentation: Contains the Dashboard Segment Action XML/XSL classes Dashboard Maintain UI
Documentation: Contains the Dashboard Maintain UI classes Dashboard Segment Detail UI
Documentation: Contains the Dashboard Segment Detail UI classes Dashboard Maintain Action XML
Documentation: Contains the Dashboard Maintain Action XML/XSL classes Dashboard Cell Detail UI
Documentation: Contains the Dashboard Cell Detail UI classes Dashboard Cell Action XML
Documentation: Contains the Dashboard Cell Action XML/XSL classes Dashboard Segment Height Action XML
Documentation: Contains the Dashboard Segment Height Action XML/XSL classes Dashboard Segment Height UI
Documentation: Contains the Dashboard Segment Height UI classes Dashboard Move Part UI
Documentation: Contains the Dashboard Move Part UI classes Dashboard Move Part Action XML
Documentation: Contains the Dashboard Move Part Action XML/XSL classes Dashboard Filter Action XML
Documentation: Contains the Dashboard Filter/Sort Action XML/XSL classes Dashboard Filter UI
Documentation:

Dashboard Column Action XML
Documentation: Contains the Dashboard Column Popup Action XML/XSL classes Assignee Popup Action XML
Documentation: Contains the Assignee Popup Action XML/XSL classes Select List UI
Documentation: Contains the Select List UI classes Dashboard Part Data Action XML
Documentation: Contains the Dashboard Part Data Action XML/XSL classes Dashboard Navigation Action XML
Documentation: Contains the Dashboard Navigation Action XML/XSL classes Dashboard Continue Action XML
Documentation: Contains the Dashboard Continue Action XML/XSL classes Interaction Diagrams
There are no interaction diagrams defined in Dashboard
FIG. 6 shows a UML use case diagram of the PCM (process change management) system. As noted above, PCM allows a Process to be developed and embossed/enforced on the operation of a team, section, department, division or company or group of companies such that the Process is available instantly through Web Technology on any Desktop connected to the Internet. A description follows.

Diagram Documentation:

Classes modPCMActionConstants <<T2AOConstants>>
Documentation:
Attributes:
TRANS_CREATEPCMDEPENDTAG : String
Documentation:
ACTION_ : String
Documentation:
TRANS_CREATEPCMEVENTTYPE : String
Documentation:
TRANS_CREATEPCMFAMILY : String
Documentation:
TRANS_CREATEPCMNARRATIVE : String
Documentation:
TRANS_CREATEPCMRULESET : String
Documentation:
TRANS_CREATEPCMRULESETRULE : String
Documentation:
TRANS_DELETEPCMDEPENDTAG : String
Documentation:
TRANS_DELETEPCMEVENTTYPE : String
Documentation:
TRANS_DELETEPCMFAMILY : String
Documentation:
TRANS_DELETEPCMNARRATIVE : String
Documentation: TRANS_DELETEPCMRULESET : String
Documentation:
TRANS_DELETEPCMRULESETRULE : String
Documentation:
TRANS_GETPCMDEPENDTAGLIST : String
Documentation:
TRANS_GETPCMEVENTTYPFDBKCATLIST : String
Documentation:
TRANS_GETPCMEVENTTYPELIST : String
Documentation:
TRANS_GETPCMFAMILYLIST : String
Documentation:
TRANS_GETPCMMODULELIST : String
Documentation:
TRANS_GETPCMNARRATIVE : String
Documentation:
TRANS_GETPCMNARRATIVELIST : String
Documentation:
TRANS_GETPCMRULESETLIST : String
Documentation:
TRANS_GETPCMRULESETRULE : String
Documentation:
TRANS_UPDATEPCMDEPENDTAG : String
Documentation:
TRANS_UPDATEPCMEVENTTYPFDBKCATLIST : String
Documentation:
TRANS_UPDATEPCMEVENTTYPE : String
Documentation:
TRANS_UPDATEPCMFAMILY : String
Documentation:
TRANS_UPDATEPCMRULESET : String
Documentation:
TRANS_UPDATEPCMRULESETRULE : String
Documentation:
TRANS_UPDATEPCMNARRATIVE : String
Documentation:
TRANS_GETPCMVIEWNARRATIVE : String
Documentation:
Operations:
N/A modPCMActionFunctions <<T2AOModule>>
Documentation:
Attributes:
N/A
Operations:
TransFunction : String
Parameters:
strFunctionName : String
strDataIn( ): Variant
Documentation:
Section: Public Function TransFunction( )
Purpose: This method calls any proprietary functions that need to be called before processing begins.
Inputs: strDataIn String—Value of data to be manipulated. i.e. (1;1)
strFunctionName String—Function name to be called. i.e. (GetDomain)
Returns : String—The value that will be returned by the proprietary function. i.e. (1)
Effects: N/A PCM <<T2ActionObject>>
Documentation:
Attributes:
N/A
Operations:
IAction_Perform : String
Parameters:
strSessionId : String
strHandler : String
strName : String
strInput : String
strFormData : String
Documentation:
If the Action is PCMNarrative and the operation="Save", check the value of the NarrativeID from the form data. If the ID is Null then call the CreatePCMNarrative method else call the UpdatePCMNarrative method.
CreatePCMDependTag : String
Parameters:
strOperation : String
strSessionId : String
strName : String
strFormData : String
Documentation:
Executes a transaction to create a new PCM Family Dependency Tag.
CreatePCMEventType : String
Parameters:
strOperation : String
strSessionId : String
strName : String
strFormData : String
Documentation:
Executes a transaction to create a new PCM Event Type.
CreatePCMFamily : String
Parameters:
strOperation : String
strSessionId : String
strName : String
strFormData : String Documentation:
Executes a transaction to create a new PCM Family.
CreatePCMNarrative : String
Parameters:
strOperation : String
strSessionId : String
strName : String
strFormData : String
Documentation:
Executes a transaction to create a new PCM Family Narrative.
CreatePCMRuleSet : String
Parameters:
strOperation : String
strSessionId : String
strName : String
strFormData : String
Documentation:
Executes a transaction to create a new PCM Rule Set.
CreatePCMRuleSetRule : String
Parameters:
strOperation : String
strSessionId : String
strName : String
strFormData : String
Documentation:
Executes a transaction to create a new PCM Rule Set Rule.
DeletePCMDependTag : String
Parameters:
strOperation : String
strSessionId : String
strName : String
strFormData : String
Documentation:
Executes a transaction to delete a PCM Family Dependency Tag.
DeletePCMEventType : String
Parameters:
strOperation : String
strSessionId : String
strName : String
strFormData : String
Documentation:
Executes a transaction to delete a PCM Event Type.
DeletePCMFamily : String
Parameters:
strOperation : String
strSessionId : String
strName : String
strFormData : String
Documentation:
Executes a transaction to delete a PCM Family.
DeletePCMNarrative : String
Parameters:
strOperation : String
strSessionId : String
strName : String
strFormData : String
Documentation:
Executes a transaction to delete a PCM Family Narrative.
DeletePCMRuleSet : String
Parameters:
strOperation : String
strSessionId : String
strName : String
strFormData : String Documentation:
Executes a transaction to delete a PCM Rule Set.
DeletePCMRuleSetRule : String
Parameters:
strOperation : String
strSessionId : String
strName : String
strFormData : String
Documentation:
Executes a transaction to delete a PCM Rule Set Rule.
GetPCMDependTagList : String
Parameters:
strOperation : String
strSessionId : String
strName : String
strFormData : String
Documentation:
Exectues the GetPCMDependTagList transaction to obtain a list of all PCM Family Dependency Tags.
GetPCMEventTypFdbkCatList : String
Parameters:
strOperation : String
strSessionId : String
strName : String
strFormData : String
Documentation:
Exectues the GetPCMEventTypFdbkCatList transaction to obtain a list of all PCM Event Types.
GetPCMEventTypeList : String
Parameters:
strOperation : String
strSessionId : String
strName : String
strFormData : String
Documentation:
Exectues the GetPCMEventTypeList transaction to obtain a list of all PCM Event Types.
GetPCMFamilyList : String
Parameters:
strOperation : String
strSessionId : String
strName : String
strFormData : String
Documentation:
Exectues the GetPCMFamilyList transaction to obtain a list of all PCM Families.
The Family List grid depends on the Process Area Code selected from the dropdown.
So first load the Process Area Code dropdown and then depending on the Process Area Code, load the appropriate PCM Family List in the grid. If the Process Area Code is blankNull, choose the first item from the list.
GetPCMModuleList : String
Parameters:
strOperation : String
strSessionId : String
strName : String
strFormData : String
Documentation:
Exectues the GetPCMModuleList transaction to obtain a list of all PCM Modules.
GetPCMNarrative : String
Parameters:
strOperation : String
strSessionId : String
strName : String
strFormData : String Documentation:
Exectues the GetPCMNarrative transaction to obtain all PCM Family Narrative details.
GetPCMNarrativeList : String
Parameters:
strOperation : String
strSessionId : String
strName : String
strFormData : String
Documentation:
Exectues the GetPCMNarrativeList transaction to obtain a list of all PCM Family Narratives.
GetPCMRuleSetList : String
Parameters:
strOperation : String
strSessionId : String
strName : String
strFormData : String
Documentation:
Exectues the GetPCMRuleSetList transaction to obtain a list of all PCM RuleSets.
GetPCMRuleSetRule : String
Parameters:
strOperation : String
strSessionId : String
strName : String
strFormData : String
Documentation:
Exectues the GetPCMRuleSetRule transaction to obtain a list of all PCM RuleSet Rules.
GetPCMRuleSetRulePriority : String
Parameters:
strOperation : String
strSessionId : String
strName : String
strFormData : String
Documentation:
This should execute the GetPCMRuleSetRule BO tranasaction.
GetPCMViewNarrative : String
Parameters:
strOperation : String
strSessionId : String
strName : String
strFormData : String
Documentation:
Executes the GetPCMViewNarrative transaction to obtain all PCM Family Narrative. This PCMViewNarrative page should invoke the ProcessStepsAction.ProcessSteps object. Make the appropriate Tech table entries. Modify the ProcessStepsAction to look for this action and operation. Call the GetProcessNarrative method. Modify the procGetProcessNarrative procedure to look for the value of @AddDate input param. If this value is Null then don't use it in the WHERE clause for any of the SELECT statements to filter based on the Effective Date.
UpdatePCMDependTag : String
Parameters:
strOperation : String
strSessionId : String
strName : String
strFormData : String Documentation:
Executes a transaction to update a PCM Family Dependency Tag.
UpdatePCMEventTypFdbkCatList : String
Parameters:
strOperation : String
strSessionId : String
strName : String
strFormData : String
Documentation:
Executes a transaction to update a PCM Event Type Feedback Category List.
UpdatePCMEventType : String
Parameters:
strOperation : String
strSessionId : String
strName : String
strFormData : String
Documentation:
Executes a transaction to update a PCM Event Type.
UpdatePCMFamily : String
Parameters:
strOperation : String
strSessionId : String
strName : String
strFormData : String
Documentation:
Executes a transaction to update a PCM Family.
UpdatePCMNarrative : String
Parameters:
strOperation : String
strSessionId : String
strName : String
strFormData : String
Documentation:
Executes a transaction to update a PCM Family Narrative.
UpdatePCMRuleSet : String
Parameters:
strOperation : String
strSessionId : String
strName : String
strFormData : String
Documentation:
Executes a transaction to update a PCM Rule Set.
UpdatePCMRuleSetRule : String
Parameters:
strOperation : String
strSessionId : String
strName : String
strFormData : String
Documentation:
Executes a transaction to update a PCM Rule Set Rule.
UpdatePCMRuleSetRulePriority : String
Parameters:
strOperation : String
strSessionId : String
strName : String
strFormData : String
Documentation:
Executes a transaction to update a PCM Rule Set Rule. Look at the gridPCMRuleSetRulePriority attribue which has a series of 'UPDATE' tranasactions for different RuleSetRules (either a ChildRuleSetID or a ModuleID). These are ordered based on the time they were updated. The last tranasaction is the latest update. Send each transaction to the BO (Change the transactio name to UpdatePCMRuleSetRule). If a particular RuleSetRule has multiple transactions, then just send the last one.

Sub Packages

PCM Module List Action XML
Documentation: Contains the PCM Module List Action XML/XSL classes PCM Module List UI
Documentation: Contains the PCM Module List Display UI classes PCM RuleSet List Action XML
Documentation: Contains the PCM RuleSet List Action XML/XSL classes PCM RuleSet List UI
Documentation: Contains the PCM RuleSet List Display UI classes PCM Event Type List Action XML
Documentation: Contains the PCM Event Type List Action XML/XSL classes PCM Event Type List UI
Documentation: Contains the PCM Event Type List Display UI classes PCM Event Type Feedback Category List Action XML
Documentation: Contains the PCM Event Type Feedback Category List Action XML/XSL classes PCM Event Type Feedback Category List UI
Documentation: Contains the PCM Event Type Feedback Category List Display UI classes PCM Family List Action XML
Documentation: Contains the PCM Family List Action XML/XSL classes PCM Family List UI
Documentation: Contains the PCM Family List Display UI classes PCM Depend Tag List Action XML
Documentation: Contains the PCM Depend Tag List Action XML/XSL classes PCM Depend Tag List UI
Documentation: Contains the PCM Depend Tag List Display UI classes PCM Narrative List Action XML
Documentation: Contains the PCM Narrative List Action XML/XSL classes PCM Narrative List UI
Documentation: Contains the PCM Narrative List Display UI classes PCM Narrative Action XML
Documentation: Contains the PCM Narrative Action XML/XSL classes PCM Narrative UI
Documentation: Contains the PCM Narrative Detail Display UI classes PCM Rule Set Rule Action XML
Documentation: Contains the PCM RuleSet Rule Action XML/XSL classes PCM Rule Set Rule UI
Documentation: Contains the PCM Rule Set Rule Display UI classes PCM View Narrative Action XML
Documentation: Contains the PCM View Narrative Action XML/XSL classes PCM View Narrative UI
Documentation: Contains the PCM View Narrative Display UI classes PCM Rule Set Rule Priority Action XML
Documentation: Contains the PCM RuleSet Rule Priority Action XML/XSL classes PCM Rule Set Rule Priority UI
Documentation: Contains the PCM Rule Set Rule Priority Display UI classes Interaction Diagrams There are no interaction diagrams defined in PCM.

Figure 7A:
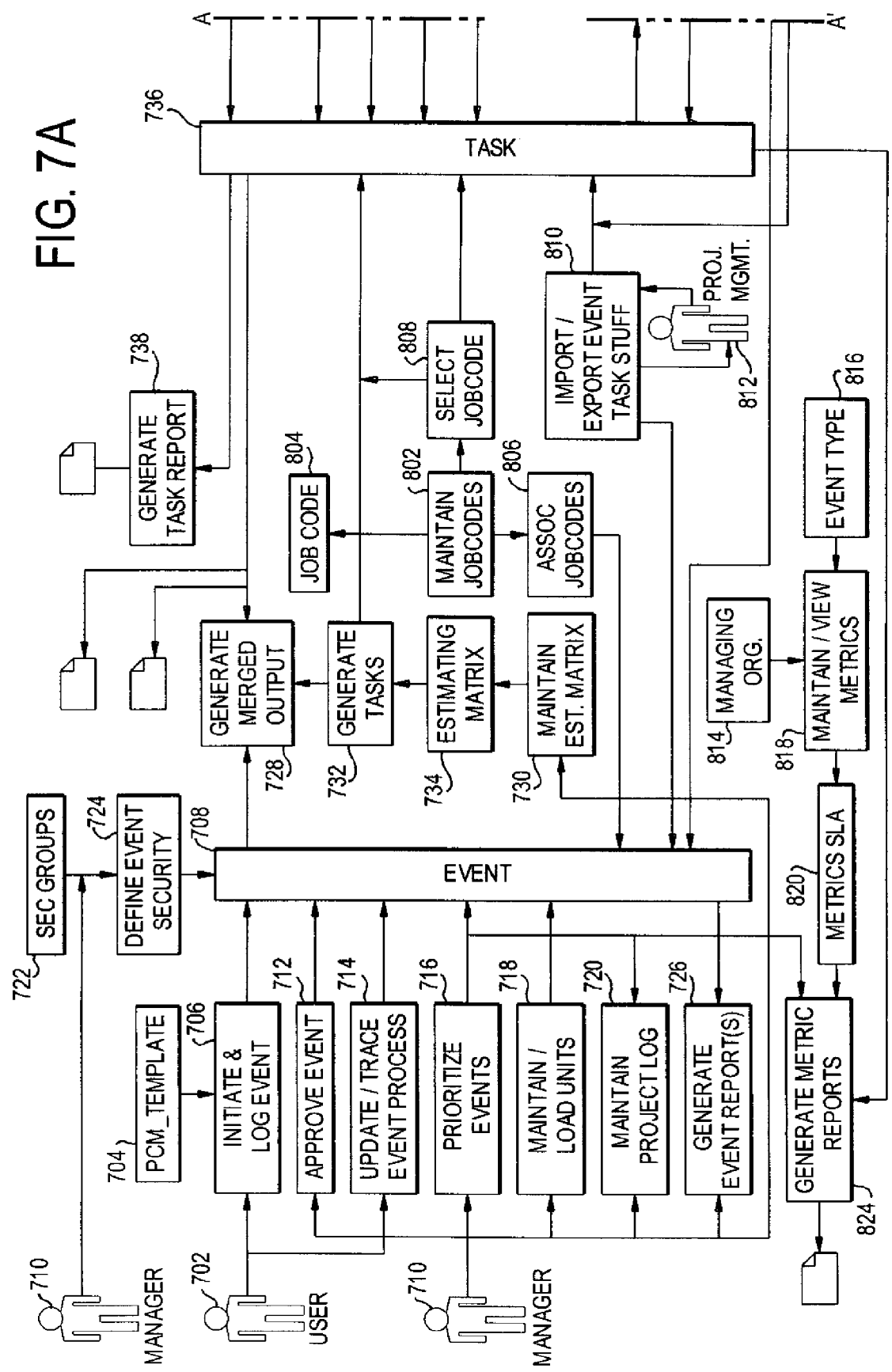
FIGS. 7A and 7B show a use case diagram of the operation of the preferred embodiment.
Figure 7B:
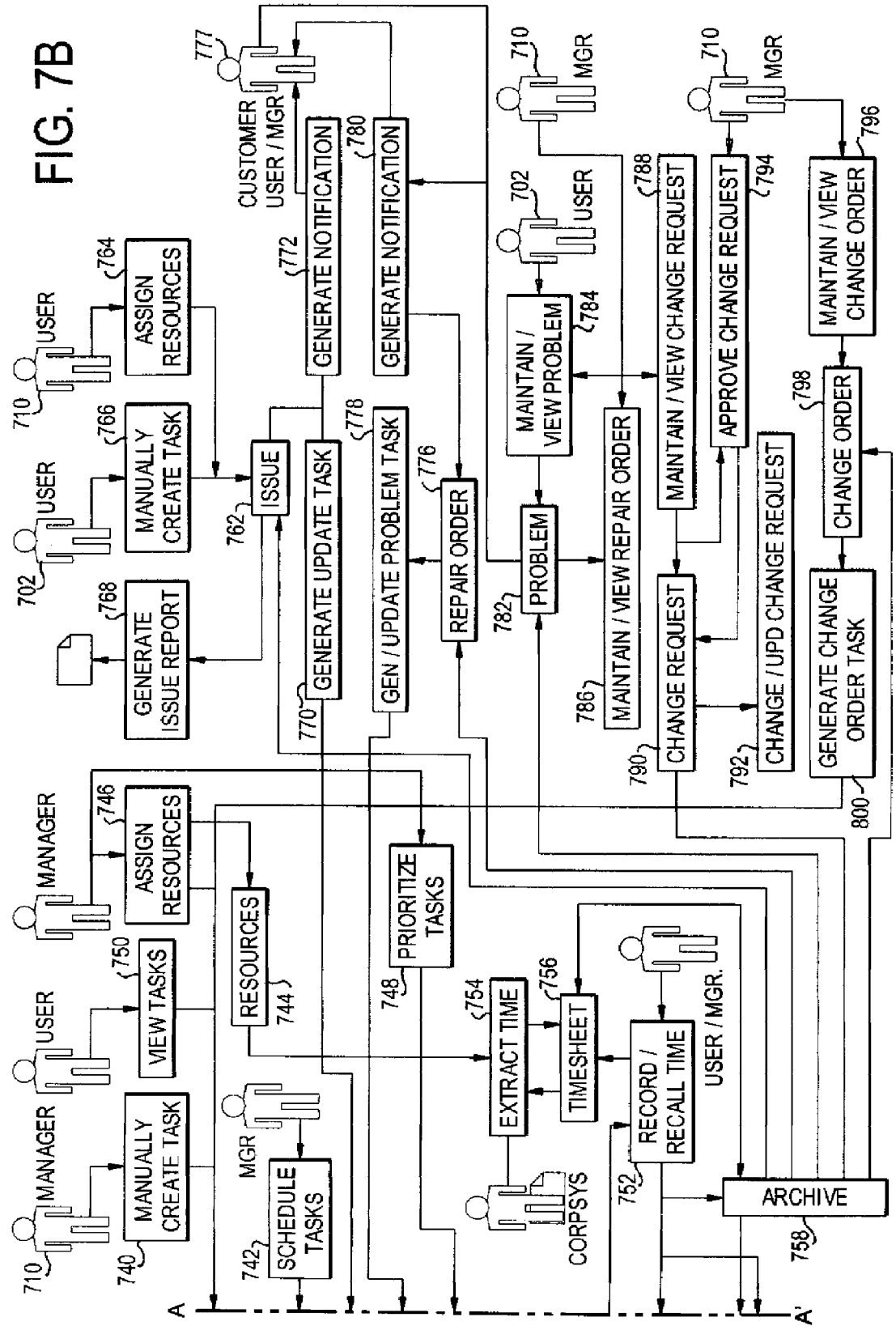

FIGS. 7A and 7B show a use case diagram of the manner in which the preferred embodiment operates overall. It will be understood that any communication with any person (e.g., a user, a manager, or a customer) can take place through the dashboard described above.

A user 702 uses a PCM template 704 to initiate and log an event in step 706, resulting in an event 708, and can update and track the event process in step 714. A manager 710 can approve the event in step 712, prioritize events in step 716, maintain and load units in step 718, and maintain the project log in step 720. A manager 710 can use security groups 722 to define event security in step 724.

Either a user 702 or a process triggered within the event 708 can generate event reports in step 726. Processes triggered with the event 708 and a task 736 (to be described below) generate merged output in step 728. A manager 710, in step 730, maintains an estimating matrix 734. The event 708 and the estimating matrix 734 result in the generation of a task 736 in step 732, which in turn leads to the generation of task reports in step 738.

Alternatively, a manager 710 can manually create tasks in step 740. A manager 710 can also schedule tasks in step 742, assign resources 744 to tasks in step 746, and prioritize tasks in step 748. A user 702 can view tasks in step 750.

A user or manager can record and recall time in step 752 and extract time in step 754. The extracted time can go to a time sheet 756 and an archive 758.

Information in the archive 758 (which will be described in detail below) can lead to the generation of an issue 762. A manager 710 can assign resources to the issue 762 in step 764. A user 702 can maintain and view the issue 762 in step 766. Issue reports are automatically generated in step 768. In accordance with the issue, a task can be generated or updated in step 770, and a notification generated in step 772 for a customer 774, a user 702, or a manager 710.

The information in the archive can also lead to the generation of a repair order 776. The repair order 776, in turn can cause the generation or updating of a problem task in step 778 or the generation of a notification in step 780 to a customer, user, or manager.

Another item that can be generated from the information in the archive 758 is a problem 782. A user 702 or a manager 710 can maintain and view the problem 782 in step 784. The manager 710 can maintain and view a repair order 786 to correct the problem 782 and can maintain and view a change request 790 in step 788. The manager can approve the change request 790 in step 794, in which case the change request is changed or updated in step 792.

The manager 710 can use step 796 to maintain and view a change order 798. A change order task is generated in step 800.

A maintain-jobcodes step 802 is used to maintain job codes 804. The job codes are associated with events 708 in step 806 and selected for tasks in step 808.

The archive 758 receives information from, and outputs it to, the tasks 736 and the timesheets 756. The archive 758 also outputs information to the events 708, the issues 762, the repair orders 776, the problems 782, and the change requests 790.

Events and tasks can be imported and exported in step 810 through a project management tool 812.

The managing organization 814 and the event type 816 are used to maintain and vie metrics 818. The metrics 818 are used in a metrics SLA 820. Metric reports are generated in step 824 in accordance with the metrics SLA 824, the events 708, and the tasks 736.

While a preferred embodiment of the present invention has been set forth in detail above, those skilled in the art who have reviewed the present disclosure will readily appreciate that other embodiments can be realized within the scope of the present invention. For example, mention of commercial software packages, platforms, and the like is illustrative rather than limiting. Also, any recitation of existing technologies should be construed as encompassing future improvements. Therefore, the present invention should be construed as limited only by the appended claims.

I claim:

1. A method for automation of a process, the method comprising:
   (a) storing a library of processes on a computer system, each of the processes in the library comprising an indication of tasks to be carried out in the process, wherein step (a) comprises storing the processes as locked down processes and disallowing any modifications to the locked down processes;
   (b) receiving a command from a user to select one of the processes from the library stored in step (a) to launch as an event;
   (c) assigning at least one person to the event launched in step (b);
   (d) determining the tasks needed to be carried out by the at least one person assigned in step (c) in accordance with the tasks in the process selected in step (b);
   (e) providing an interface to said at least one person, the interface comprising an indication of the tasks determined in step (d), an expected status of each task, and an actual status of each task;
   (f) receiving, through the interface, an indication that a person has completed one of the tasks;
   (g) determining a next one of the tasks to be carried out by the person;
   (h) displaying the next one of the tasks to the person as determined in step (g);
   (i) storing an amount of time in which the person has completed each of the tasks as well as remaining time estimates;
   (j) developing and reporting metric reports, including productivity metrics;
   (k) issue/problem tracking and reporting; and
   (l) revising at least one of the processes stored in step (a) by: unlocking the at least one process, modifying the at least one process in accordance with the metric reports generated in step (j), and re-locking down the process to disallow all modifications.

2. The method of claim 1, wherein at least one of steps (b) and (e) is performed over the Internet or an intranet.

3. The method of claim 2, wherein step (e) comprises implementing the interface as a Web page.

4. The method of claim 1, comprises receiving a modification for at least one of the processes stored in the library, unlocking the at least one process, making the received modification to the at least one process, and re-locking down the at least one process for which the modification has been received.

5. The method of claim 4, wherein, when a modification is made to the process selected in step (b), steps (d) and (e) are modified in real time in accordance with the modification to the process.

6. A system for automation of a process, the system comprising:
   an electronic storage medium; and
   a processor in electronic communication with the electronic storage medium;
   the storage medium storing code to control the processor to:
   (a) store a library of processes on the electronic storage medium, each of the processes in the library comprising an indication of tasks to be carried out in the process, wherein step (a) comprises storing the processes as locked down processes and disallowing any modifications to the locked down processes;
   (b) receive a command from a user to select one of the processes from the library stored in step (a) to launch as an event;
   (c) assign at least one person to the event launched in step (b);
   (d) determine the tasks needed to be carried out by the at least one person assigned in step (c) in accordance with the tasks in the process selected in step (b);
   (e) provide an interface to said at least one person, the interface comprising an indication of the tasks determined in step (d), an expected status of each task, and an actual status of each task;
   (f) receive, through the interface, an indication that a person has completed one of the tasks;
   (g) determine a next one of the tasks to be carried out by the person;
   (h) display the next one of the tasks to the person as determined in step (g);
   (i) store an amount of time in which the person has completed each of the tasks as well as remaining time estimates;
   (j) develop and report metric reports, including productivity metrics;
   (k) track and report issues/problems; and
   (l) revising at least one of the processes stored in step (a) by: unlocking the at least one process, modifying the at least one process in accordance with the metric reports generated in step (j), and re-locking down the process to disallow all modifications.

7. The system of claim 6, wherein the code comprises code for performing at least one of steps (b) and (e) over the Internet or an intranet.

8. The system of claim 7, wherein the code comprises code for implementing the interface as a Web page.

9. The system of claim 6, wherein the code comprises code for receiving a modification for at least one of the processes stored in the library, unlocking the at least one process, making the received modification to the at least one process, and re-locking down the at least one process for which the modification has been received.

10. The system of claim 9, wherein the code comprises code for controlling the processor such that, when a modification is made to the process selected in step (b), steps (d) and (e) are modified in real time in accordance with the modification to the process.

11. An article of manufacture for use in automating a process, the article of manufacture comprising:

an electronic storage medium; and code, stored in the electronic storage medium, the code being code for executing on a computer system to:

(a) store a library of processes in the computer system, each of the processes in the library comprising an indication of tasks to be carried out in the process, wherein step (a) comprises storing the processes as locked down processes and disallowing any modifications to the locked down processes;

(b) receive a command from a user to select one of the processes from the library stored in step (a) to launch as an event;

(c) assign at least one person to the event launched in step (b);

(d) determine the tasks needed to be carried out by the at least one person assigned in step (c) in accordance with the tasks in the process selected in step (b);

(e) provide an interface to said at least one person, the interface comprising an indication of the tasks determined in step (d), an expected status of each task, and an actual status of each task;

(f) receive, through the interface, an indication that a person has completed one of the tasks;

(g) determine a next one of the tasks to be carried out by the person;

(h) display the next one of the tasks to the person as determined in step (g);

(i) store an amount of time in which the person has completed each of the tasks as well as remaining time estimates;

(j) develop and report metric reports, including productivity metrics;

(k) track and report issues/problems; and (l) revise at least one of the processes stored in step (a) by: unlocking the at least one process, modifying the at least one process in accordance with the metric reports generated in step (j), and re-locking down the process to disallow all modifications.

12. The article of manufacture of claim 11, wherein the code comprises code for performing at least one of steps (b) and (e) over the Internet or an intranet.

13. The article of manufacture of claim 12, wherein the code comprises code for implementing the interface as a Web page.

14. The article of manufacture of claim 11, wherein the code comprises code for receiving a modification for at least one of the processes stored in the library, unlocking the at least one process, making the received modification to the at least one process, and re-locking down the at least one process for which the modification has been received.

15. The article of manufacture of claim 14, wherein the code comprises code for controlling the computer system such that, when a modification is made to the process selected in step (b), steps (d) and (e) are modified in real time in accordance with the modification to the process.

* * * * *